United States Patent
Närhi et al.

(10) Patent No.: US 11,446,764 B2
(45) Date of Patent: Sep. 20, 2022

(54) LASER WELDING STACKED FOILS

(71) Applicant: Corelase Oy, Tampere (FI)

(72) Inventors: Matti Närhi, Lempäälä (FI); Henri Pajukoski, Kangasala (FI)

(73) Assignee: Corelase Oy, Tampere (FI)

( * ) Notice: Subject to any disclaimer, the term of this patent is extended or adjusted under 35 U.S.C. 154(b) by 291 days.

(21) Appl. No.: 16/828,194

(22) Filed: Mar. 24, 2020

(65) Prior Publication Data

US 2021/0299785 A1 Sep. 30, 2021

(51) Int. Cl.
| | |
|---|---|
| *B23K 26/21* | (2014.01) |
| *B23K 26/24* | (2014.01) |
| *B23K 26/32* | (2014.01) |
| *B23K 26/03* | (2006.01) |
| *B23K 26/073* | (2006.01) |
| *B23K 103/10* | (2006.01) |
| *B23K 103/12* | (2006.01) |

(52) U.S. Cl.
CPC ............ *B23K 26/21* (2015.10); *B23K 26/034* (2013.01); *B23K 26/0734* (2013.01); *B23K 2103/10* (2018.08); *B23K 2103/12* (2018.08)

(58) Field of Classification Search
CPC ............ B23K 26/21–211; B23K 26/22; B23K 26/24–244; B23K 26/26; B23K 26/32–323; B23K 26/38–382
See application file for complete search history.

(56) References Cited

U.S. PATENT DOCUMENTS

| | | | | |
|---|---|---|---|---|
| 2013/0168371 | A1* | 7/2013 | Furusako | B23K 35/3073 219/121.64 |
| 2018/0361504 | A1 | 12/2018 | Uchida et al. | |
| 2019/0118299 | A1* | 4/2019 | Kangastupa | B23K 26/322 |
| 2019/0305285 | A1 | 10/2019 | Tao et al. | |
| 2019/0366479 | A1 | 12/2019 | Hioki et al. | |
| 2020/0009686 | A1 | 1/2020 | Ogura et al. | |
| 2021/0362271 | A1* | 11/2021 | Brescoe | B23K 26/0622 |

FOREIGN PATENT DOCUMENTS

| | | |
|---|---|---|
| JP | 2014136242 A1 | 7/2014 |
| WO | WO-2018011456 A1 | 1/2018 |
| WO | WO-2019129917 A1 | 7/2019 |

OTHER PUBLICATIONS

International Search Report and Written Opinion for International Patent Application No. PCT/EP2021/055772, dated Jul. 2, 2021, 13 pages.
Kaisera et al., "Application benefits of welding copper with a 1 kW, 515 nm continuous wave laser", 10th CIRP Conference on Photonic Technologies, 2018, 6 pages.

* cited by examiner

*Primary Examiner* — Michael A Laflame, Jr.

(74) *Attorney, Agent, or Firm* — Morrison & Foerster LLP

(57) ABSTRACT

A method for laser keyhole welding a stack of metal foils to a metal tab is disclosed. The method independently adjusts power in a focused center beam and power in a focused annular beam to form a weld through all the foils and the tab. The annular beam provides sufficient power to heat the metal to about melting temperature, widen a mouth of a keyhole, and stabilize a melt pool. The center beam provides sufficient additional power to form the keyhole. The power of the annular beam is sustained for a longer time than the power of the center beam. A plurality of such welds is formed to provide mechanical strength and electrical conductivity.

32 Claims, 7 Drawing Sheets

LASER WELDING STACKED FOILS

TECHNICAL FIELD OF THE INVENTION

The present invention relates in general to welding using focused beams of laser-radiation. The invention relates in particular to welding a stack of metal foils using a focused center beam and a focused annular beam.

DISCUSSION OF BACKGROUND ART

Beams of laser-radiation are increasingly used for cutting, drilling, welding, marking, and scribing workpieces made of a wide range of materials; including metals and metal alloys. Traditional mechanical processing produces unwanted defects, such as micro-cracks that may propagate when a processed workpiece is stressed, thereby degrading and weakening the processed workpiece. Laser processing minimizes such unwanted defects, is generally cleaner, and causes a smaller heat-affected zone. Laser machining uses a focused laser beam to produce precise cuts and holes, having high-quality edges and walls, while minimizing the formation of unwanted defects.

In laser welding, a focused laser beam locates each weld spot or seam precisely, while minimizing collateral heating. It is useful to distinguish two main laser welding regimes. Conduction welding occurs at lower laser powers and lower power densities. Absorbed laser power heats the irradiated material, melting material in each part to be joined, which flows, mixes, and then solidifies. Keyhole welding occurs at higher laser powers and higher power densities that are sufficient to vaporize some of the irradiated material. Pressure of the vaporized material on surrounding melted material opens a channel through the melted material, having a characteristic narrow and deep profile, which allows deep penetration of the laser beam. Finished keyhole welds are generally narrower, deeper, and stronger than conduction welds. However, it can be difficult to maintain a stable keyhole in a hot and dynamic pool of melted material.

Lithium ion batteries are the critical enabling technology for portable electronic devices, electric vehicles, and most other contemporary rechargeable electrical devices. Each cell of a battery includes two stacks of thin metal foils that are immersed in an electrolyte. The metal is most often aluminum or copper and the foils have a typical thickness of about 10 micrometers (μm). There are typically 20 to 40 individual foils in each foil stack. Foil stacks may be rolled into cylinders or lie flat. The electrolyte is a lithium salt dissolved in a solvent. Each foil stack is electrically connected to a metal tab that protrudes from the cell for electrical connection. Multiple cells are electrically connected to form a battery, in series and/or in parallel, depending on the voltage and current requirements of the electrical device. Multiple batteries may be electrically connected, in series and/or in parallel, to form a battery pack.

The mechanical attachment and electrical connection of each foil in a stack to the respective tab is critical for the integrity, reliability, and performance of the battery. However, joining multiple thin metal foils to a much thicker metal tab is challenging, especially when the foil stack and tab are made of different materials. The completed joint must be strong, durable, and have low electrical resistance. Precision resistance welding is used, but relies on interface resistance for these metals with high electrical conductivity, and the high thermal conductivity of these metals means a lot of current must be applied. Ultrasonic welding is used, but requires mechanical compression of the parts to be joined, which must be joined prior to any assembly. Aluminum has a durable oxide layer that must be broken in such non-laser processes. For these reasons, laser welding is preferred, providing precise delivery of power to minimize overall heat accumulation. Keyhole laser welding can form a strong weld through the full thickness of a foil stack and a tab. Some battery designs include additional foil-to-tab joints for attaching and connecting cells within the battery that also benefit from keyhole laser welding.

One problem when keyhole laser welding is ejection of molten material from the weld pool, due to a combination of vapor pressure, shear stress caused by vapor flow, recoil due to evaporation, and rapid circulation of material around the weld pool, which overcomes the surface tension of the molten material. Droplets of this ejected material, known as "spatter", recondense on the metal surfaces causing contamination. This ejection leaves material missing from the top and bottom surfaces of a completed weld, thereby weakening the completed weld. Another problem when keyhole laser welding is an inconsistent penetration depth, due to the complex dynamics involved in forming and maintaining the keyhole.

There is need for a rapid, simple, and reliable process to laser weld metal foil stacks to metal tabs that produces clean consistent welds. The process must produce a strong joint through the full thickness of every foil stack and tab, with low electrical resistance therebetween. Preferably, this process would not increase the cost-per-weld and would be compatible with high-volume automated manufacturing.

SUMMARY OF THE INVENTION

In one aspect, a method for laser welding a plurality of copper foils onto a copper tab in accordance with the present invention comprises assembling the foils into a stack and compressing the stack of foils and the tab to form a workpiece. A focused beam of laser radiation is directed to a surface of the workpiece at a location-to-be-welded. The focused beam includes a center beam and a concentric annular beam. The power of the annular beam is ramped up to a first power and sustained for a first time that is sufficient to heat the surface of the workpiece at the location-to-be-welded to at least 1100 kelvin (K). The power of the center beam is ramped up to a second power and reaches the second power after the surface of the workpiece at the location-to-be-welded reaches 1100 K. The power of the center beam is sustained for a second time that is sufficient to melt through all the foils and the tab, thereby forming a weld that joins all the foils and the tab.

In another aspect, a method for laser welding a plurality of aluminum foils onto an aluminum tab in accordance with the present invention comprises assembling the foils into a stack and compressing the stack of foils and the tab to form a workpiece. A focused beam of laser radiation is directed to a surface of the workpiece at a location-to-be-welded. The focused beam includes a center beam and a concentric annular beam. The power of the annular beam is ramped up to a first power while ramping the power of the center beam up to a second power. The power of the annular beam is sustained for a first time. The power of the center beam is sustained for a second time and then the power of the center beam is ramped down. The first time is longer than the second time. The second time is sufficient to melt through all the foils and the tab, thereby forming a weld that joins all the foils and the tab.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
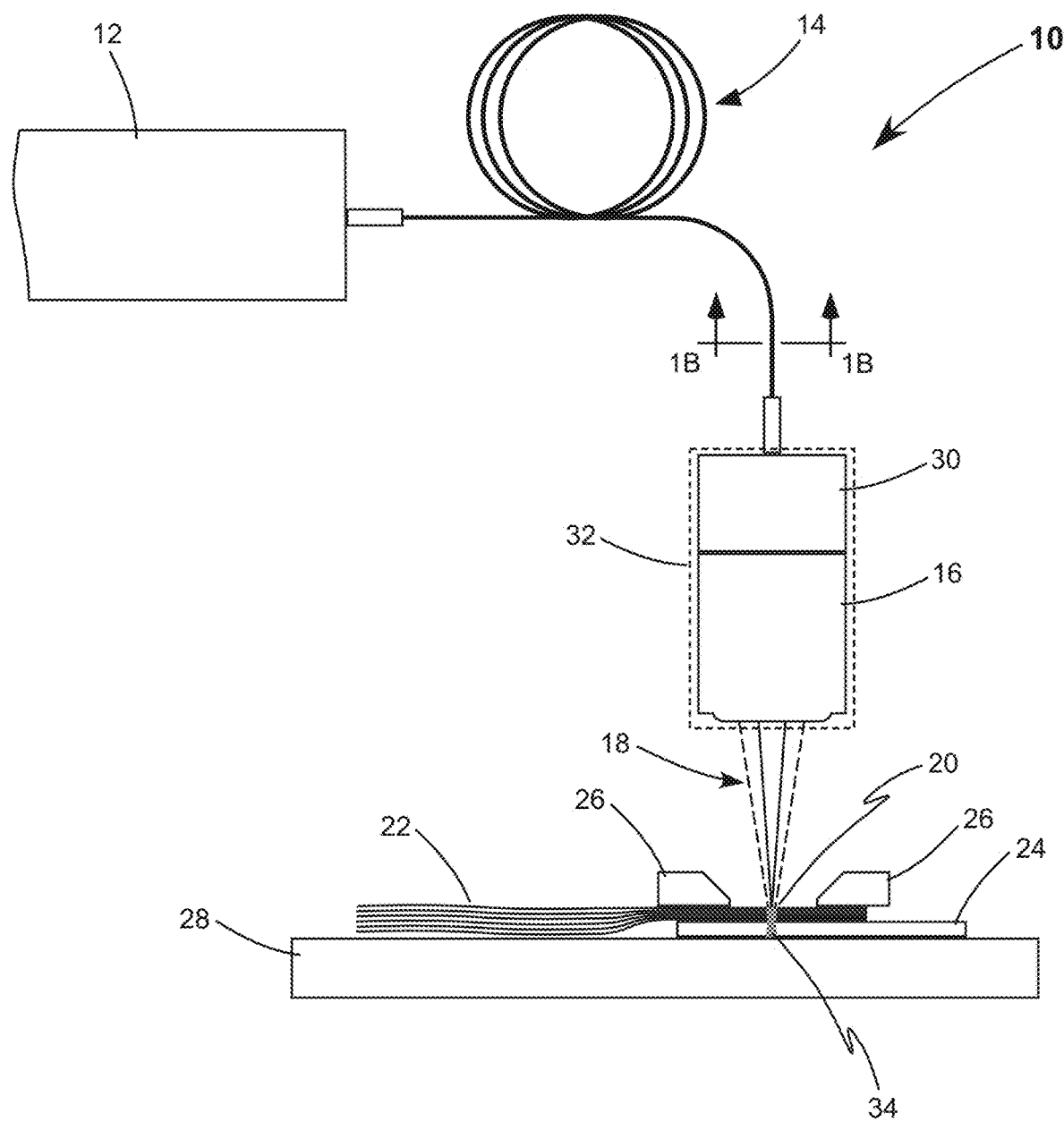
FIG. 1A is a side-view, partially in cross-section, schematically illustrating one preferred embodiment of laser welding apparatus for implementing the laser welding method of the present invention, the apparatus including a laser source generating at least two beams of laser-radiation, an optical fiber, and a focusing lens.
Figure 1B:
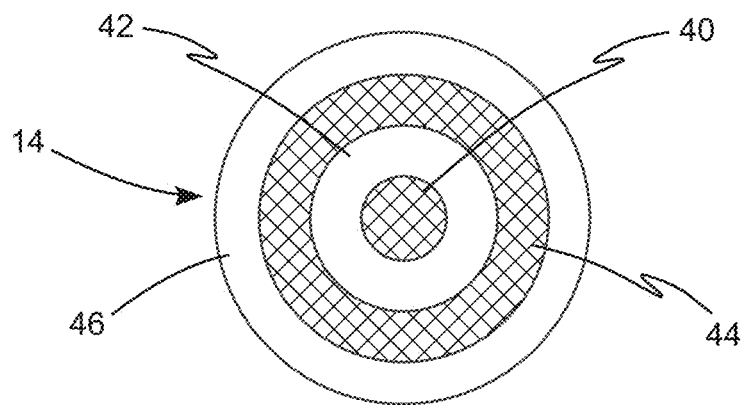
FIG. 1B is a cross-sectional view schematically illustrating details of the optical fiber of FIG. 1A, which has a center core for guiding a center beam and an annular core for guiding an annular beam.

Referring now to the drawings, wherein like components are designated by like numerals, FIGS. 1A and 1B schematically illustrate an apparatus 10 that is used in the laser welding method of the present invention. A laser source 12 delivers at least two beams of laser radiation through an optical fiber 14 to a focusing lens 16. Optical fiber 14 includes a center core 40 for guiding a center beam of laser radiation. Center core 40 has a concentric low refractive index cladding 42. Optical fiber 14 further includes an annular core 44 for guiding an annular beam of laser radiation. Annular core 44 is concentrically located between low refractive index cladding 42 and a low refractive index cladding 46. Laser source 12 is configured to deliver the center beam to center core 40 and the annular beam to the annular core 44. Laser systems integrating such a laser source with such an optical fiber are commercially available. For example, the Highlight™ FL-ARM laser from Coherent Inc. of Santa Clara, Calif. One feature of this laser system is that powers of the center and annular beams can be selected and adjusted independently.

Focusing lens 16 forms a focused beam 18, comprising a focused center beam depicted as converging solid lines and a concentric focused annular beam depicted as converging dashed lines. The focused beams converge towards a focus 20, where the focused center beam has a much smaller diameter than the concentric focused annular beam. Focused beam 18 is directed onto a workpiece, which comprises a stack of metal foils 22 and a metal tab 24 to be welded together. Stack 22 and tab 24 could be made of copper, nickel, nickel-plated copper, aluminum, steel alloy, or any other metal or metal alloy selected to make a cell or battery. The stack and tabs may be made of the same metals or different metals. Stack 22 and tab 24 are compressed by a clamp 26 to form the workpiece and eliminate gaps between individual foils in the stack and between the stack and the tab. Any residual gaps are preferably less than 20% of the thickness of an individual foil and most preferably less than 10% of the thickness of an individual foil. In the drawing, the workpiece and the clamp are depicted in cross section.

The workpiece is supported and moved as needed by a translation stage 28. Focus 20 is located close to a front surface of the workpiece. The focus is moved laterally across the workpiece by a beam scanner 30, which could include acousto-optic deflectors or galvanometer-actuated mirrors to enable rapid movement of focus 20 during laser welding. Beam scanner 30 and focusing lens 16 may conveniently be integrated into a laser processing head 32. By way of example, focusing lens 16 could be a flat-field objective to maintain a consistent depth-of-focus across the whole surface of workpiece accessible with laser processing head 32. Processing head 32 may also include an optional beam expander (not depicted here), located between optical fiber 14 and focusing lens 16, to expand and collimate the beams emerging from the optical fiber prior to focusing. A weld 34 is formed through the workpiece when exposed to focused beam 18.

Figure 2:
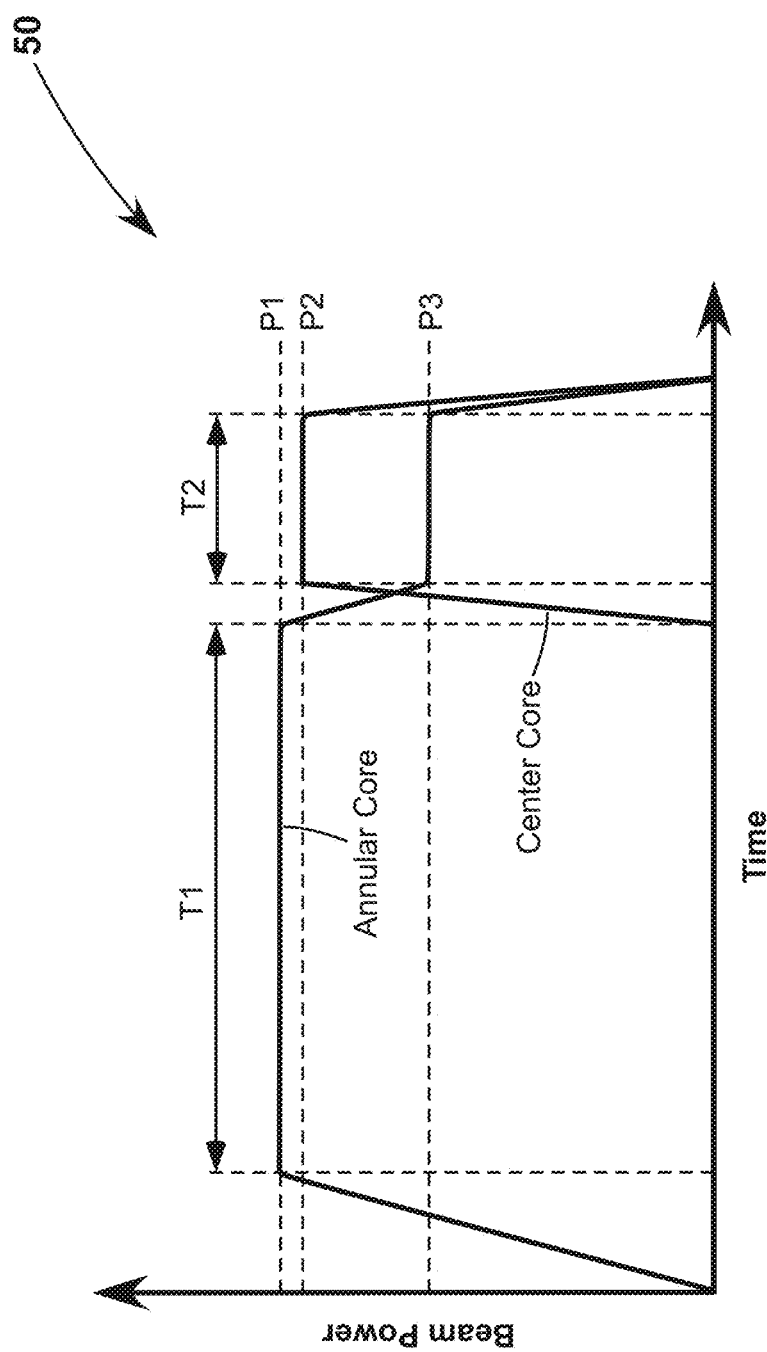
FIG. 2 is a graph of beam power vs. time, schematically illustrating a laser welding method in accordance with the present invention, using the apparatus of FIGS. 1A and 1B for welding a stack of copper foils to a copper tab.

FIG. 2 schematically illustrates power in the center core and power in the annular core vs. time for one preferred embodiment of laser welding method 50 in accordance with the present invention, for welding a plurality of foils onto a tab. Here, the foils and the tab are made of copper, nickel-plated copper, or a copper alloy. The foils are initially assembled into a stack and the stack of foils is pressed onto the tab by a clamp. A front surface of the workpiece is exposed to focused beam 18, which is directed to a location-to-be-welded on the front surface. The power of the annular beam is ramped up to a first power P1 and is sustained at the first power P1 for a first time T1, which is sufficient to heat the surface of the workpiece at the location-to-be-welded to at least 1100 K, and more preferably above 1300 K. During first time T1, the annular beam preheats the surface of the workpiece. It is known that for copper at around 1300 K, there is an abrupt reduction in thermal conductivity and an abrupt increase in optical absorption for radiation having a wavelength of about 1 µm. Heating copper through this temperature reduces the thermal conductivity by about a factor of two and increases the near-infrared optical absorption by about a factor of three.

Towards the end of first time T1, the power of the center beam is ramped up to a second power P2 and is sustained at the second power P2 for a second time T2, which is sufficient to melt through all the foils of stack 22 and tab 24. This melting by the center beam forms a weld 34 that joins all of the foils of stack 22 and tab 24. The focused center beam preferably forms a keyhole in the melted material that penetrates through all the foils and the tab. The power of the annular beam is ramped down to a third power P3 while the power of the center beam is ramped up to second power P2. Third power P3 is selected to be sufficient to keep the mouth of the keyhole wide open, allowing metal vapor to escape from the keyhole and minimizing formation of spatter. During second time T2, the power of the center beam is preferably limited to a minimum power required to melt through all the foils and the tab, while the power of the annular beam is preferably limited to a minimum power required to prevent spatter. Minimizing the total power applied to the workpiece reduces a heat-affected zone around the completed weld and prevents the formation of any unwanted defects in the welded workpiece.

Figure 3A:
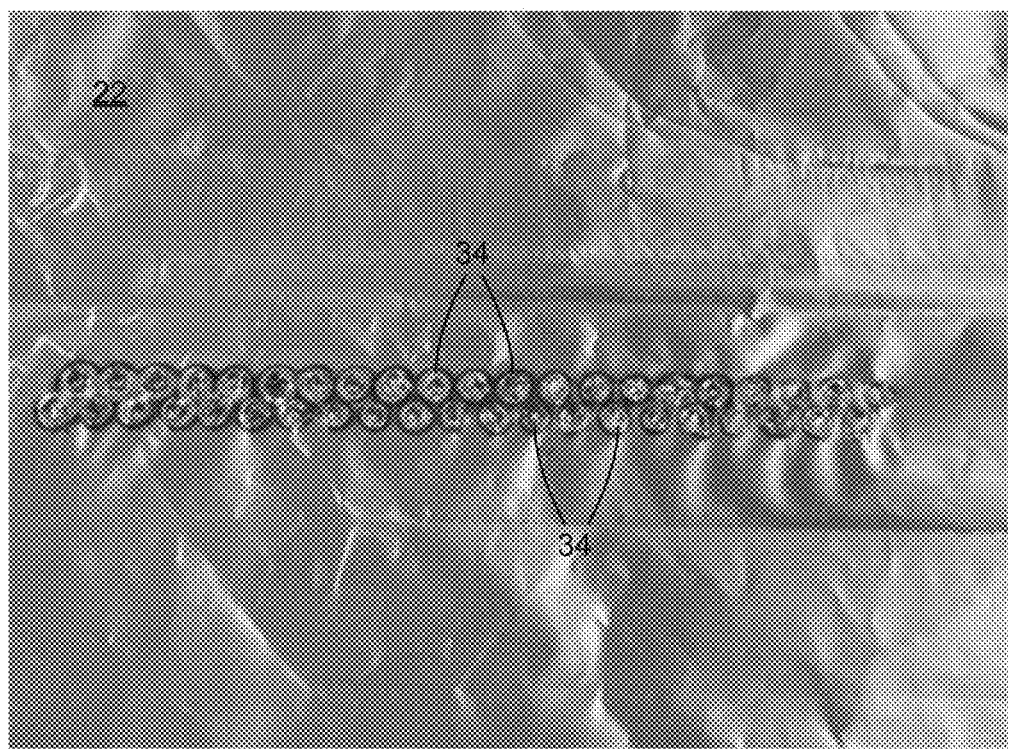
FIG. 3A is a plan view and FIG. 3B is a magnified plan view of welds in a copper workpiece made using the inventive method of FIG. 2, the photographs showing a surface of the stack of foils, which was the front surface during welding.
Figure 3B:
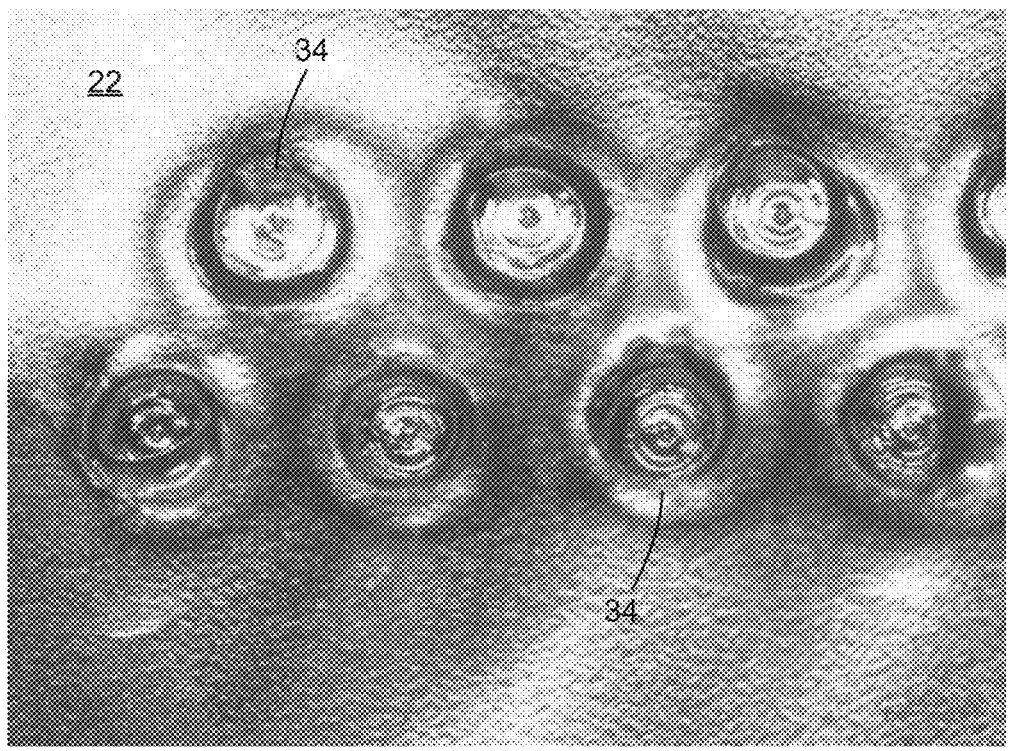

FIG. 3A is a plan-view photograph of an exemplary workpiece welded using method 50 of FIG. 2. FIG. 3B is a higher-magnification plan-view photograph of the same welded workpiece. The workpiece was a stack of 25 copper foils pressed onto a copper tab that was nickel plated. Each foil had a thickness of 6 μm and the tab had a thickness of 300 μm.

Referring to FIGS. 1A and 1B, laser source 12 was a Highlight™ FL8000-ARM laser, providing up to 4 kW of power independently through each core of optical fiber 14 at a wavelength of 1070 nanometers. Center core 40 had a diameter of 100 μm and annular core 44 had outside diameter of 290 μm. Laser processing head 32 was a SCANLAB intelliSCAN 30 scan head, available from SCANLAB GmbH of Puchheim, Germany. Focusing lens 16 provided 1.4× magnification, such that the focused center beam had a diameter of about 140 μm and the focused annular beam had an outside diameter of about 405 μm. Nitrogen shield gas was directed towards the location-to-be-welded on the workpiece during welding. Focused beam 18 was applied to the surface of the stack at about normal angle-of-incidence (90°) as depicted in the drawing. An angle-of-incidence of between 80° and 90° was found to be beneficial. Clamp 26 was machined from a single block of metal and pressed onto the workpiece around the locations-to-be-welded. Focused beam 18 was directed onto the workpiece through a cut-out in the clamp.

FIGS. 3A and 3B show a surface of the stack, which was the front surface of the workpiece exposed to the focused beam and therefore the entry surface during keyhole welding. The workpiece was welded at 42 locations along two staggered rows. In the example depicted, the rows were welded sequentially, by directing the focused beam to consecutive locations along a row. At each location, power was applied through the annular and center cores as depicted in FIG. 2 to create a weld. Here, first power P1=1500 watts (W), second power P2=1450 W, third power P3=1000 W, first time T1=1 millisecond (ms), and second time T2=1 ms.

Herein, an "off-power" refers to a power that is too low to melt a surface of the workpiece and too low to damage the workpiece during a prolonged exposure to the focused beam. The off-power in the example depicted was 0 W. The power of the annular beam was ramped from the off-power up to first power P1 over about 3 ms. The power of the center beam was ramped from the off-power up to second power P2 over about 1 ms, while the power of the annular beam was simultaneously ramped from first power P1 down to third power P3. The power in the center beam was ramped from second power P2 down to the off-power and the power in the annular beam was simultaneously ramped from third power P3 down to the off-power over about 1 ms. Power was applied at each location for a total time of about 7 ms and it took an overall time of about 0.54 s to complete all 42 welds. This overall time included time taken to translate the focused beam between locations.

Preheating provided by the focused annular beam during first time T1 reduced the near-infrared power required for deeper melting and welding that is provided the focused center beam. The preheating thereby reduced the laser energy applied to the workpiece and reduced the heat-affected zone. Preheating enabled the focused center beam to penetrate deeper into the workpiece, which further improved weld quality.

In laser welding method 50 applied in the example of FIGS. 3A and 3B, the power of the center beam was ramped up to second power P2 simultaneously with the power of the annular beam being ramped down to third power P3. However, this simultaneous ramping is not a necessary condition to form a successful weld. It is sufficient that the center beam reaches second power P2 after the surface of the stack reaches 1100 K and that the two focused beams together maintain at least this temperature until the center beam reaches second power P2. Similarly, simultaneous ramping of the two beams to an off-power is not necessary to form a successful weld. For some workpieces, it may be favorable to sustain the power of the annular beam until the center beam is ramped down to a power where the keyhole collapses.

Laser welding method 50 would have a typical first power P1 between about 1350 W and about 1650 W, a typical second power P2 between about 1300 W and about 1600 W, and a typical third power P3 between about 700 W and about 1300 W. The first time T1 would typically be between about 0.2 ms and about 10 ms and the second time T2 would typically be between about 0.1 ms and about 5 ms in duration.

Figure 4:
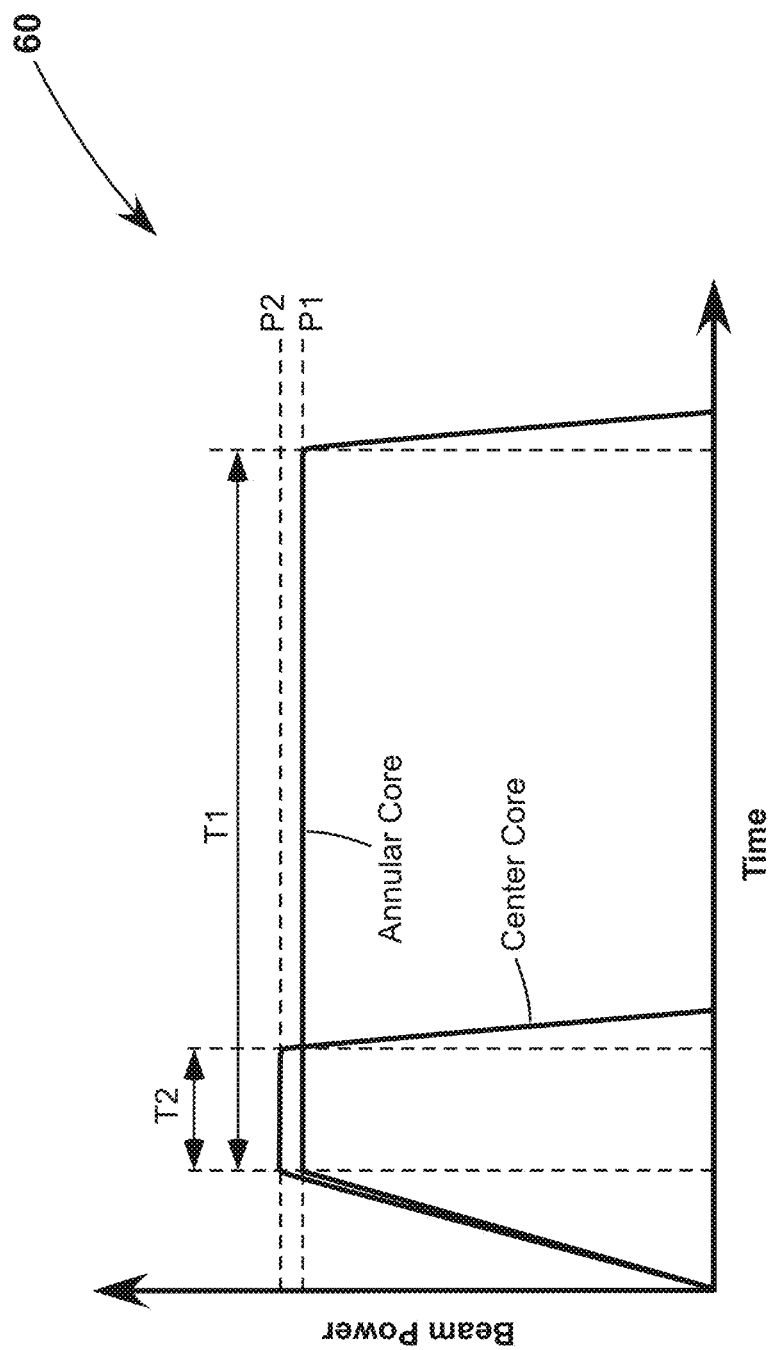
FIG. 4 is a graph of beam power vs. time, schematically illustrating a laser welding method in accordance with the present invention, using the apparatus of FIGS. 1A and 1B for welding a stack of aluminum foils to an aluminum tab.

FIG. 4 schematically illustrates power in the center core and power in the annular core vs. time for another preferred embodiment of laser welding method 60 in accordance with the present invention, for welding a plurality of foils onto a tab. Here, both the foils and the tab are made of aluminum or an aluminum alloy. Again, the foils are initially assembled into a stack and the stack of foils is pressed onto the tab by a clamp. A front surface of the workpiece is exposed to focused beam 18, which is directed to a location-to-be-welded on the front surface of the workpiece. The power of the annular beam is ramped up to a first power P1, while the power of the center beam is ramped up to a second power P2. The power of the annular beam is sustained for a first time T1 and then ramped down. The power of the center beam is sustained for a second time T2, which is shorter than first time T1, and then ramped down. The second time T2 is selected to be sufficiently long to melt through all the foils of stack 22 and tab 24. This melting by the center beam forms a weld 34 that joins all of the foils of stack 22 and tab 24. The first time T1 is selected to be sufficiently long to allow a controlled collapse of the keyhole and controlled contraction of the melt pool. This controlled collapse and contraction allows metal vapor to escape the melt pool, thereby preventing voids in the welded workpiece, as well as providing annealing to minimize any crack formation.

Figure 5A:
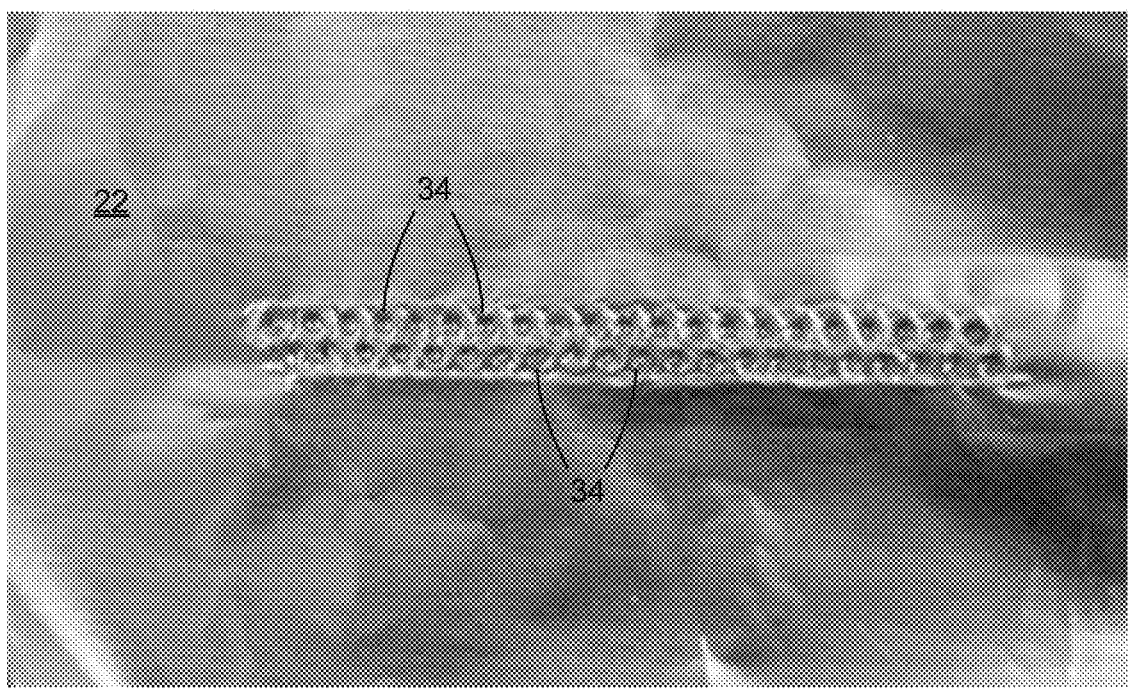
FIG. 5A is a plan view of welds in an aluminum workpiece made using the inventive method of FIG. 4, the photograph showing a surface of the stack of foils, which was the front surface during welding.
Figure 5B:
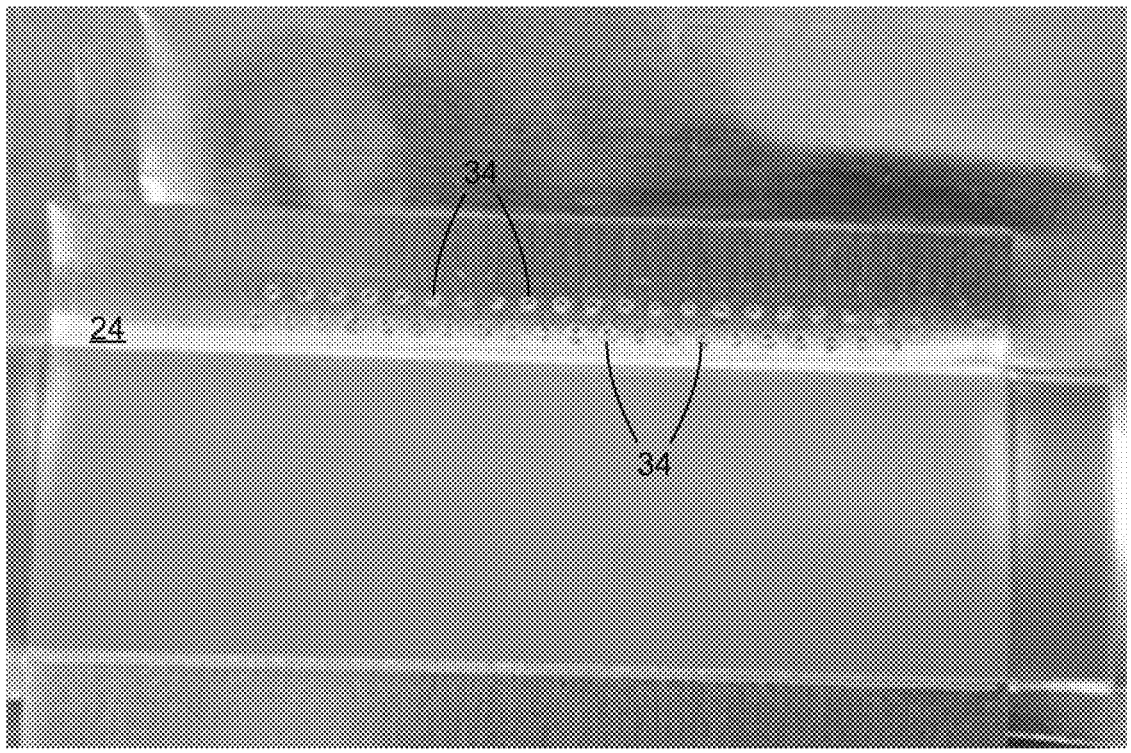
FIG. 5B is a plan view of welds in the workpiece of FIG. 5A, the photograph showing a surface of the tab, which was the back surface during welding.

FIGS. 5A and 5B are plan-view photographs of an exemplary workpiece welded using method 60 of FIG. 4. The workpiece was a stack of 24 aluminum foils pressed onto an aluminum tab. Each foil had a thickness of 12 μm and the tab had a thickness of 400 μm. The laser source, optical fiber, laser processing head, focusing lens, shield gas, and clamp were the same as in the example of FIGS. 3A and 3B. FIG. 5A shows a surface of the stack, which was the front surface of the workpiece exposed to the focused beam and therefore the entry surface during keyhole welding. FIG. 5B shows the back surface of the tab. The workpiece was welded at 42 locations along two staggered rows, with the rows welded sequentially. At each location, power was applied through the annular and center cores as depicted in FIG. 4 to create a weld. Here, first power P1=1500 W, second power P2=1600 W, first time T1=5 ms, and second time T2=1 ms.

The off-power in the example depicted was 0 W. The power of the annular beam was ramped from the off-power up to first power P1 over about 3 ms, while the power of the center beam was simultaneously ramped from the off-power up to second power P2. The power in the center beam was ramped from second power P2 down to the off-power over about 1 ms. The power in the annular beam was ramped from first power P1 down to the off-power over about 1 ms. Power was applied at each location for a total time of about 9 ms and it took an overall time of about 2.06 s to complete all 42 welds. The simultaneous ramping of the annular beam to first power P1 and the center beam to second power P2 in this example was found to be beneficial to prevent splattering.

Figure 6:
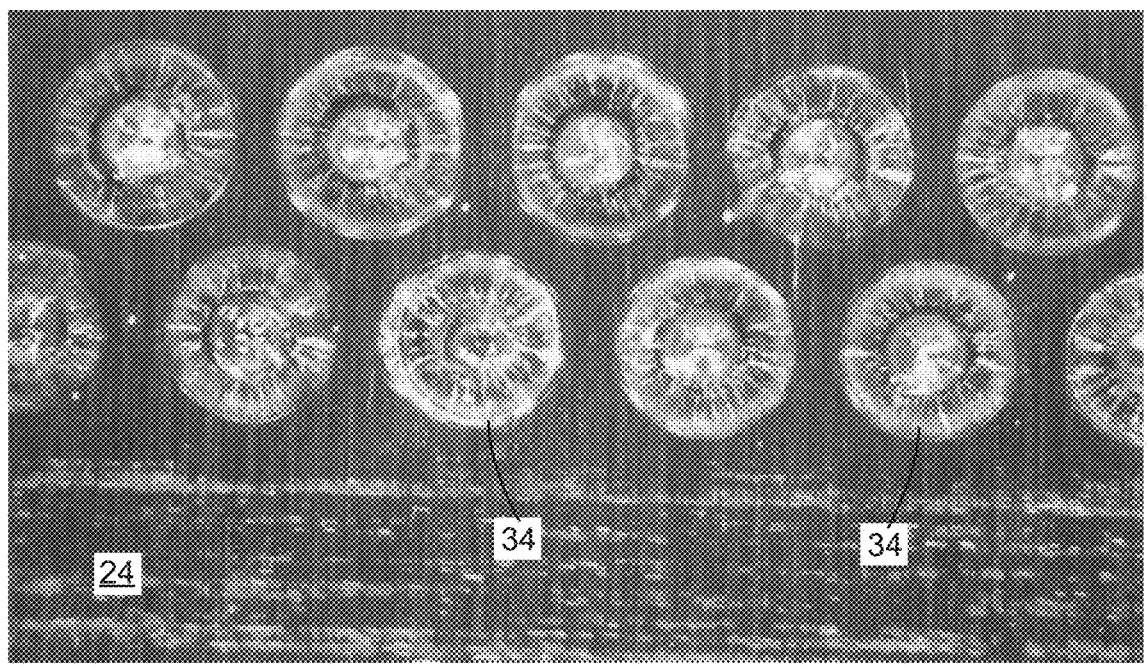
FIG. 6 is a plan view of welds in an aluminum workpiece made using the inventive method of FIG. 4, the photograph showing a surface of the tab, which was the front surface during welding.

FIG. 6 is a plan-view photograph of another exemplary workpiece welded using method 60 of FIG. 4. The workpiece here was an aluminum tab pressed onto a stack of 24 aluminum foils. Each foil had a thickness of 12 µm and the tab had a thickness of 400 µm. The laser source, optical fiber, shield gas, and clamp were the same as in the examples above. Laser processing head 32 was a RLSK 3d Remote Laser Welding Head, available from II-VI Inc. of Kleinmachnow, Germany. Focusing lens 16 provided 3× magnification, such that the focused center beam had a diameter of about 300 µm and the focused annular beam had an outside diameter of about 870 µm. The drawing shows the surface of the tab, which was the surface of the workpiece exposed to the focused beam and therefore the entry surface during keyhole welding. The workpiece was welded at 40 locations along two staggered rows, with the rows welded sequentially. Here, first power P1=1500 W, second power P2=1600 W, first time T1=6 ms, and second time T2=1 ms.

The off-power in the example depicted was 0 W. The power of the annular beam was ramped from the off-power up to first power P1 over about 8 ms, while the power of the center beam was simultaneously ramped from the off-power up to second power P2. The power in the center beam was ramped from second power P2 down to the off-power over about 1 ms. The power in the annular beam was ramped from first power P1 down to the off-power over about 2 ms. Power was applied at each location for a total time of about 16 ms and it took an overall time of about 1.07 s to complete all 40 welds.

A typical workpiece for laser welding methods 50 and 60 would have between 20 and 100 individual foils to be welded onto a tab. Each foil would have a typical thickness between about 5 µm and about 15 µm. A typical tab would have a thickness between about 100 µm and about 500 µm. A typical focused center beam diameter would be between about 100 µm and about 400 µm and a typical focused annular beam diameter would be between about 300 mm and about 1200 mm on the surface of the workpiece. Laser welding method 60 would have a typical first power P1 between about 1350 W and about 1650 W and a typical second power P2 between about 1450 W and about 1750 W. The first time T1 would typically be between about 0.5 ms and about 20 ms and the second time T2 would typically be between about 0.1 ms and about 5 ms in duration.

FIGS. 5A, 5B, and 6 together demonstrate that the inventive welding method works with focused beam 18 incident onto either the outside surface of stack 22 or the opposite outside surface of tab 24. In general, it is necessary to make a plurality of welds to securely join a stack of foils to a tab. A larger number and higher density of welds will provide a stronger joint with higher electrical conductivity. However, one of skill in the art would recognize that there is a compromise between the total number of welds and the overall time to complete all of those welds, so the number and density of welds would be specific to a particular application. The overall area of a workpiece that is welded is easily scaled by changing the number of individual welds. The inventive method can be applied to join a stack of foils to an anode or cathode tab within a cell. The inventive method can also be applied to join foils that electrically connect cells within a battery of cells.

Beam scanner 30 translates focused beam 18 laterally between the plurality of locations-to-be-welded on the workpiece. A weld is made at each of these locations by delivering a pulse of laser radiation through each core of the fiber, through the focusing lens, and onto the workpiece. FIGS. 2 and 4, respectively, depict power profiles of the pulse pairs used to make each weld for laser welding methods 50 and 60. Although linear power ramping was shown and discussed herein, for simplicity of illustration and description, the inventive welding method could be optimized by applying other types of power ramping of the center beam and/or annular beam. For example, exponential power ramping.

Although the annular beam and center beam were sustained at constant powers in the examples herein, first power P1 and second power P2 respectively, the inventive welding method could be further optimized by modulating the powers of these beams during first time T1 and second time T2. For example, in laser welding method 60 of FIG. 4, by rapidly cycling the power of the annular beam between first power P1 and a much lower power to expel metal vapor and thereby prevent the formation of voids in the weld. Alternatively, by ramping down from first power P1 to a lower power after the keyhole closes, to anneal the cooling metal and thereby prevent the formation of cracks in the weld. The critical requirements are to provide sufficient power in the annular beam to widen the mouth of the keyhole during keyhole welding, to stabilize the weld pool, and then to allow a controlled collapse of the keyhole and a controlled contraction of the melt pool.

In summary, an inventive method is described above for welding a stack of metal foils onto a metal tab using a focused laser beam that includes a center beam and an annular beam. The focused annular beam has sufficient power to heat a location-to-be-welded to about the melting temperature of the metal. The focused center beam has sufficient additional power and is sustained for sufficient time to form a keyhole weld that joins all the foils and the tab. The annular beam is sustained for a longer time, which provides pre-heating for high thermal conductivity metals (such as copper) and post-heating for metals prone to vapor entrapment (such as aluminum). The method is repeated to form welds at a sufficient number and density of locations to provide the mechanical strength and electrical conductivity required for a specific application.

The present invention is described above in terms of a preferred embodiment and other embodiments. The invention is not limited, however, to the embodiments described and depicted herein. Rather, the invention is limited only by the claims appended hereto.

What is claimed is:

1. A method for laser welding a plurality of copper foils onto a copper tab, comprising the steps of:
   assembling the foils into a stack and compressing the stack of foils and the tab to form a workpiece;
   directing a focused beam of laser radiation to a surface of the workpiece at a location-to-be-welded, the focused beam including a center beam and a concentric annular beam;

ramping the power of the annular beam up to a first power;

sustaining the power of the annular beam for a first time that is sufficient to heat the surface of the workpiece at the location-to-be-welded to at least 1100 kelvin;

ramping the power of the center beam up to a second power, the center beam reaching the second power after the surface of the workpiece at the location-to-be-welded reaches 1100 kelvin; and sustaining the power of the center beam for a second time that is sufficient to melt through all the foils and the tab, thereby forming a weld that joins all the foils and the tab.

2. The method of claim 1, wherein the power of the annular beam is sustained at the first power during the step of sustaining the power of the annular beam.

3. The method of claim 1, wherein the power of the annular beam is modulated during the step of sustaining the power of the annular beam.

4. The method of claim 1, wherein the power of the center beam is sustained at the second power during the step of sustaining the power of the center beam.

5. The method of claim 1, wherein the power of the center beam is modulated during the step of sustaining the power of the center beam.

6. The method of claim 1, wherein the power of the annular beam is ramped down to a third power during the step of ramping up the power of the center beam.

7. The method of claim 6, wherein the power of the annular beam is sustained at the third power during the second time.

8. The method of claim 6, wherein the power of the annular beam is modulated during the second time.

9. The method of claim 6, wherein the third power is between 700 watts and 1300 watts.

10. The method of claim 1, wherein the first power is between 1350 watts and 1650 watts.

11. The method of claim 1, wherein the second power is between 1300 watts and 1600 watts.

12. The method of claim 1, wherein the first time is between 0.2 milliseconds and 10 milliseconds in duration.

13. The method of claim 1, wherein the second time is between 0.1 milliseconds and 5 milliseconds in duration.

14. The method of claim 1, wherein the focused beam is directed onto the surface of the workpiece at an angle-of-incidence between 80 degrees and 90 degrees.

15. The method of claim 1, wherein between 20 and 100 foils are welded onto the tab.

16. The method of claim 1, wherein each foil has a thickness between 5 micrometers and 15 micrometers.

17. The method of claim 1, wherein the steps of directing the focused beam, ramping up the power of the annular beam, sustaining the power of the annular beam, ramping up the power of the center beam, and sustaining the power of the center beam are repeated a plurality of times to form a plurality of welds at a plurality of locations.

18. The method of claim 1, wherein the center beam has a diameter between 100 microns and 400 microns on the surface of the workpiece and the annular beam has a diameter between 300 microns and 1200 microns on the surface of the workpiece.

19. A method for laser welding a plurality of aluminum foils onto an aluminum tab, comprising the steps of:

assembling the foils into a stack and compressing the stack of foils and the tab to form a workpiece;

directing a focused beam of laser radiation to a surface of the workpiece at a location-to-be-welded, the focused beam including a center beam and a concentric annular beam;

ramping the power of the annular beam up to a first power while ramping the power of the center beam up to a second power;

sustaining the power of the annular beam for a first time; and sustaining the power of the center beam for a second time, then ramping down the power of the center beam, the first time being longer than the second time;

wherein the second time is sufficient to melt through all the foils and the tab, thereby forming a weld that joins all the foils and the tab.

20. The method of claim 19, wherein the power of the annular beam is sustained at the first power during the step of sustaining the power of the annular beam.

21. The method of claim 19, wherein the power of the annular beam is modulated during the step of sustaining the power of the annular beam.

22. The method of claim 19, wherein the power of the center beam is sustained at the second power during the step of sustaining the power of the center beam.

23. The method of claim 19, wherein the power of the center beam is modulated during the step of sustaining the power of the center beam.

24. The method of claim 19, wherein the first power is between 1350 watts and 1650 watts.

25. The method of claim 19, wherein the second power is between 1450 watts and 1750 watts.

26. The method of claim 19, wherein the first time is between 0.5 milliseconds and 20 milliseconds in duration.

27. The method of claim 19, wherein the second time is between 0.1 milliseconds and 5 milliseconds in duration.

28. The method of claim 19, wherein the focused beam is directed onto the surface of the workpiece at an angle-of-incidence between 80 degrees and 90 degrees.

29. The method of claim 19, wherein between 20 and 100 foils are welded onto the tab.

30. The method of claim 19, wherein each foil has a thickness between 5 micrometers and 15 micrometers.

31. The method of claim 19, wherein the steps of directing the focused beam, ramping up the powers of the annular beam and center beam, sustaining the power of the annular beam, and sustaining the power of the center beam are repeated a plurality of times to form a plurality of welds at a plurality of locations.

32. The method of claim 19, wherein the center beam has a diameter between 100 microns and 400 microns on the surface of the workpiece and the annular beam has a diameter between 300 microns and 1200 microns on the surface of the workpiece.

* * * * *